US012711541B2

(12) United States Patent
Abo Fool et al.

(10) Patent No.: US 12,711,541 B2
(45) Date of Patent: Aug. 18, 2026

(54) METHOD OF ONLINE SHOPPING AND SYSTEM THEREFOR

(71) Applicant: Ubi Shopping Ltd., Haifa (IL)

(72) Inventors: Taher Abo Fool, Jatt Ha'Meshulash (IL); Ashraf Rayan, Kabul Regional Council (IL)

(73) Assignee: UBI SHOPPING LTD., Haifa (IL)

( * ) Notice: Subject to any disclaimer, the term of this patent is extended or adjusted under 35 U.S.C. 154(b) by 6 days.

(21) Appl. No.: 18/535,276

(22) Filed: Dec. 11, 2023

(65) Prior Publication Data

US 2024/0394787 A1 Nov. 28, 2024

(30) Foreign Application Priority Data

May 24, 2023 (IL) ........................................ 303210

(51) Int. Cl.
*G06Q 30/0601* (2023.01)
*G06Q 10/087* (2023.01)

(52) U.S. Cl.
CPC ... *G06Q 30/06444* (2025.08); *G06Q 10/0874* (2025.08); *G06Q 30/0617* (2013.01); *G06Q 30/0633* (2013.01)

(58) Field of Classification Search
CPC .......... G06Q 10/087; G06Q 10/08744; G06Q 30/0601–06444; G06V 10/40–70; G06V 10/764–771; G06V 10/778; G06V 10/82; G06V 10/88; G06V 10/96; G06V 20/10; G06V 20/20; G06V 20/35; G06V 20/36; G06V 20/48; H04L 12/1813; H04L 65/403
See application file for complete search history.

(56) References Cited

U.S. PATENT DOCUMENTS

2014/0247368 A1* 9/2014 Chinn .................... H04N 23/64 348/207.1
2018/0084078 A1* 3/2018 Yan ........................ H04L 67/63
2019/0272425 A1* 9/2019 Tang ...................... G06T 19/006
2020/0034909 A1* 1/2020 Noplos .................. G06Q 10/20
2020/0226672 A1* 7/2020 Dillon .................... H04N 7/141
2020/0286161 A1* 9/2020 Marguello ......... G06Q 30/0639
2021/0027360 A1* 1/2021 Shmueli .................. G06F 1/163
2021/0082024 A1 3/2021 Sivan et al.
2021/0334889 A1* 10/2021 Isgar ...................... H04N 7/185
2021/0390601 A1* 12/2021 Itoh .................... G06Q 20/3224

(Continued)

FOREIGN PATENT DOCUMENTS

CN 110505427 A 11/2019
TW M311956 U 5/2007

OTHER PUBLICATIONS

Reif, R., Günthner, W.A. Pick-by-vision: augmented reality supported order picking. Vis Comput 25, 461-467 (2009). https://doi.org/10.1007/s00371-009-0348-y. Mar. 3, 2009. (Year: 2009).*

*Primary Examiner* — William J Allen
(74) *Attorney, Agent, or Firm* — FisherBroyles, LLP; Roger L. Browdy; James E. Mrose

(57) ABSTRACT

A computer-implemented method for online shopping is provided. The method includes providing a plurality of items for purchase, receiving a purchase order for at least one item selected by a user from among the plurality of items, and during at least part of the fulfillment of the purchase order, initiating a video conference with a user's device operated by the user.

26 Claims, 3 Drawing Sheets

(56) References Cited

U.S. PATENT DOCUMENTS

| | | | | |
|---|---|---|---|---|
| 2023/0005041 | A1* | 1/2023 | Vangapelli | G06Q 30/0643 |
| 2023/0044773 | A1* | 2/2023 | Alonso | G06Q 30/0631 |
| 2023/0419392 | A1* | 12/2023 | Wang | G06Q 30/0633 |
| 2024/0037863 | A1* | 2/2024 | Cocchiarella | G06Q 30/0627 |
| 2024/0144172 | A1* | 5/2024 | Subramanian | G06Q 10/087 |
| 2024/0144173 | A1* | 5/2024 | Ahuja | G06K 7/1417 |

* cited by examiner

METHOD OF ONLINE SHOPPING AND SYSTEM THEREFOR

TECHNICAL FIELD

The presently disclosed subject matter relates to online shopping and, more particularly, to performing interactive online shopping.

BACKGROUND

Over the last decades, the online shopping industry has gained a massive and growing share of the global retail market. Like many other industries, selling and purchasing goods and services online has undergone a substantial transformation following the advent of the Internet, and customers are able to purchase products and services more easily and ship them to their premises, without the need to approach the stores at all.

However, the ease of online shopping may be intimidating to some customers. While in regular retail shopping, the customer is able to communicate with the seller or a representative of the seller, in online shopping there is no face-to-face interaction, and the customer completes the entire order on his/her computer or mobile device. The lack of ability to communicate with the seller may intimidate potential customers from performing online shopping.

Another problem of online shopping, resulting from the fact that the shopping is performed on the computer, is the lack of complete information about the product. Without the ability to look closely at the product from different angles, or maybe feel the product with your hands, the customer may purchase a product that does not suit him, leading to a return process, if available. The returning process is both time-consuming and incurs costs, both for the customer and for the seller, and reduces the satisfaction level of both parties, the seller and the customer.

The above problems may be enhanced in retail shopping, in particular in consumable products, some of which are sold without packaging, or may have different characteristics which are taken into consideration during the purchase.

There is therefore a desire to reduce the uncertainty involved in online shopping.

GENERAL DESCRIPTION

The uncertainty of completing an order online, without interaction between the seller and the customer during the stages of the purchase, has led to steps taken by the sellers to provide more information to the customer. 360 angle images or videos are provided for products, in case of consumable products that have specific nutrition or may cause allergies, information that may be crucial for certain customers, such information being available and presented to the customer during the ordering process. However, this is sometimes not sufficient for customers to decrease their uncertainty, as they lack the face-to-face interaction required to complete the purchase. Also, it entails mapping and preparing detailed information on every new product.

Also, for customers who are more confident to perform online shopping, presentation of the information is not always sufficient. In the case of a supermarket which sells consumable products such as vegetables, it is not possible to provide authentic images or videos of the actual vegetables that the customer will eventually get. Even if the customer has added some particular requirements and comments for the seller, the product is picked up by a collector who may consider some vegetables as meeting the customer's needs, while, in fact, had the customer selected the vegetables himself, he would not have picked up the same vegetables.

There is therefore provided, in accordance with certain embodiments of the presently disclosed subject matter, a computer-implemented method for online shopping, carried out in an interactive manner, where a video conference is performed between the customer and seller, at the time the order is fulfilled.

The video conference between the person who collects the items in the order, and the remote customer, may increase the certainty required for some customers, and meet the missing need for face-to-face interaction. In cases where the collector is a machine or a robot, the certainty level may also be increased, since the customer sees that the order is being picked up to his satisfaction. Also, during the interactive video conference, additional information on the products may be provided, such that it reduces the total number of returns. In the case of consumable products such as vegetables or fruits, the video conference, which may be accompanied by a video of the products that the customer selected, enables the customer to guide the person who collects the products, with more specific instructions, bringing him closer, as if the customer is selecting the products by himself. In case of consumable products with specific ingredients, nutrition data, allergies, or special diet, which may be crucial for the customer, or in cases where the products that were ordered are available on the delivery day and substitutions are offered to the customer, during the video conference the customer is able to indicate whether he desires the product or substitution, in view of this additional information now being provided to him, either with respect to the product he selected, or with respect to the substitution.

The additional information and confidence achieved by conducting a video conference during order fulfillment or order picking-up process of items, results in an increase in the confidence of customers to perform online shopping, and in a larger number of orders being concluded with customers who were satisfied with the products they received, while reducing the overall amount and number of returns.

For the purpose of illustration and simplicity only, the following description is provided for consumable products ordered from a supermarket. Those skilled in the art will readily appreciate that the teachings of the presently disclosed subject matter are, likewise, applicable to non-consumable products, such as electronics or clothing, ordered from a remote warehouse, sometimes in a different country than the country where the customer resides. The video conference, in such cases, may provide the additional confidence required for the customers by interacting face-to-face with the sellers, or by actually seeing the products being picked up from a remote warehouse, packaged, and sent for shipping. Likewise, in cases where the products cannot be completely well defined in images or video, such as in clothing, where seeing, in a video, the act of the collector touching the material, may provide the missing information for the customer, or seeing the actual color in video, which may be different than that which was presented in the image of the item as provided by the seller, can fulfill some of the missing information to the customer.

According to a first aspect of the presently disclosed subject matter, there is provided a computer-implemented method for online shopping, the method comprising:

providing a plurality of items for purchase;

receiving a purchase order for at least one item selected by a user from among the plurality of items; and during fulfillment of the purchase order, initiating a video conference with a user's device operated by the user.

In addition to the above features, the computer-implemented method according to this aspect of the presently disclosed subject matter can optionally comprise in some examples one or more of features (i) to (xix) below, in any technically possible combination or permutation:

i. Wherein the video conference occurs when at least one item is being picked up.

ii. The method further comprises:
  in response to receiving the purchase order, sharing with the user's device a video conference connection link; and
  initiating the video conference via the link.

iii. The method comprises obtaining a captured video of the selected at least one item and one or more proximate items for optional purchase in a region of the selected items; and
  providing in real-time at least one of the following data to be displayed on the user's device at substantially the same time as the video conference:
  at least part of the captured video; and
  data pertaining to at least one of the proximate items.

iv. Wherein the at least part of the captured video includes video of the selected at least one item.

v. The method further comprises:
  prior to providing the data, processing the captured video to identify the proximate items, wherein each identified proximate item constitutes a candidate; and
  providing stored data pertaining to at least one candidate to be displayed on the user's device.

vi. The method comprises using a Machine Learning (ML) model to process the captured video.

vii. Wherein the ML model is trained to:
  identify separate objects in a given video; and
  classify images and text appearing on each object to a stored item.

viii. Wherein the text includes at least one of the following data: nutrition data, name of manufacturer, list of ingredients, and allergies.

ix. Wherein the video is captured during discontinuous movement of a collector capturing the video, and wherein processing the video further comprises:
  detecting a pause in the movement of the collector;
  start processing the video; and
  stop processing the video in response to detecting the movement.

x. Wherein processing the video further comprises calculating a likelihood score for the at least one candidate; and
  wherein providing the stored data comprises providing stored data pertaining to the candidate having the highest score.

xi. Wherein the likelihood score is calculated based on at least one of the following data: history data of the user, current location of the collector, and context-based similarity of the candidate to a selected item.

xii. Wherein the likelihood score is calculated based on a degree of matching of the selected items and the candidate, to one of more stored recipes.

xiii. Wherein the likelihood score is calculated based on a degree of frequency of the candidate in stored recipes.

xiv. The method further comprises providing data pertaining to at least one stored recipe associated with the candidate having the highest score.

xv. Wherein the likelihood score is calculated based on a degree of similarity of the user to other users.

xvi. Wherein the degree of similarity is determined using a similarity Machine Learning (ML) model trained to classify a given user into a plurality of user classes.

xvii. Wherein the similarity ML model is trained to classify a feature vector comprising a plurality of features that are extracted from a profile and activities of the given user to a plurality of user classes, wherein the activities of the user are selected from a group comprising at least: history of purchases, frequency of purchases, and history of recipes and/or items previously provided to given user.

xviii. The method further comprises:
  receiving a selection made by the user of one of the candidates.

xix. Wherein each item of the plurality of items for purchase is associated with an identifying vector using a vector embedding Machine Learning (ML) model, and wherein the method further comprises:
  repeatedly:
  processing the captured video to identify the selected item using the vector embedding ML model;
  adding the identified selected item to previously identified selected items, together constituting a virtual cart; and
  in response to a mismatch between the virtual cart and the purchase order, taking an action.

The presently disclosed subject matter further comprises a computer system for online shopping, comprising a processing circuitry that comprises at least one processor and a computer memory, the processing circuitry being configured to execute a method as described above with reference to the first aspect, and may optionally further comprise one or more of the features (i) to (xix) listed above, mutatis mutandis, in any technically possible combination or permutation.

The presently disclosed subject matter further comprises a non-transitory computer readable storage medium tangibly embodying a program of instructions that, when executed by a computer, cause the computer to perform a method as described above with reference the first aspect, and may optionally further comprise one or more of the features (i) to (xix) listed above, mutatis mutandis, in any technically possible combination or permutation.

According to a second aspect of the presently disclosed subject matter there is provided a system for online shopping, the system comprising:

a shopping management server configured to provide a plurality of items for purchase, and to receive a purchase order for at least one item selected by a user from among the plurality of items;

a collector device configured to communicate with the user device; and wherein a video conference between the user's device operated by the user and the collector device may be initiated during fulfillment of the purchase order.

In addition to the above features, the system according to this aspect of the presently disclosed subject matter can comprise one or more of features (i) to (iii) listed below, in any desired combination or permutation which is technically possible:

i. The system further comprises:
  a camera located in a storage, facility (warehouse) configured to communicate with the shopping management server and the user's device, wherein the camera is configured to capture a video of the selected at least one item and one or more proximate items for optional purchase in a region of the selected items;

the shopping management server is configured to obtain a captured video of the selected at least one item and one or more proximate items for optional purchase in a region of the selected items and to provide in real-time at least one of the following data to be displayed on the user's device at substantially the same time as the video conference:

at least part of the captured video; and data pertaining to at least one of the proximate items.

ii. Wherein the camera is configured to capture a video of the selected at least one item.

iii. Wherein the camera is connected to a collector, and wherein the camera is configured to capture the video during discontinuous movement of the collector, and wherein the shopping management server is configured to:

detect a pause in the movement of the collector;

start processing the video; and stop processing the video in response to identifying the movement.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

Figure 1:
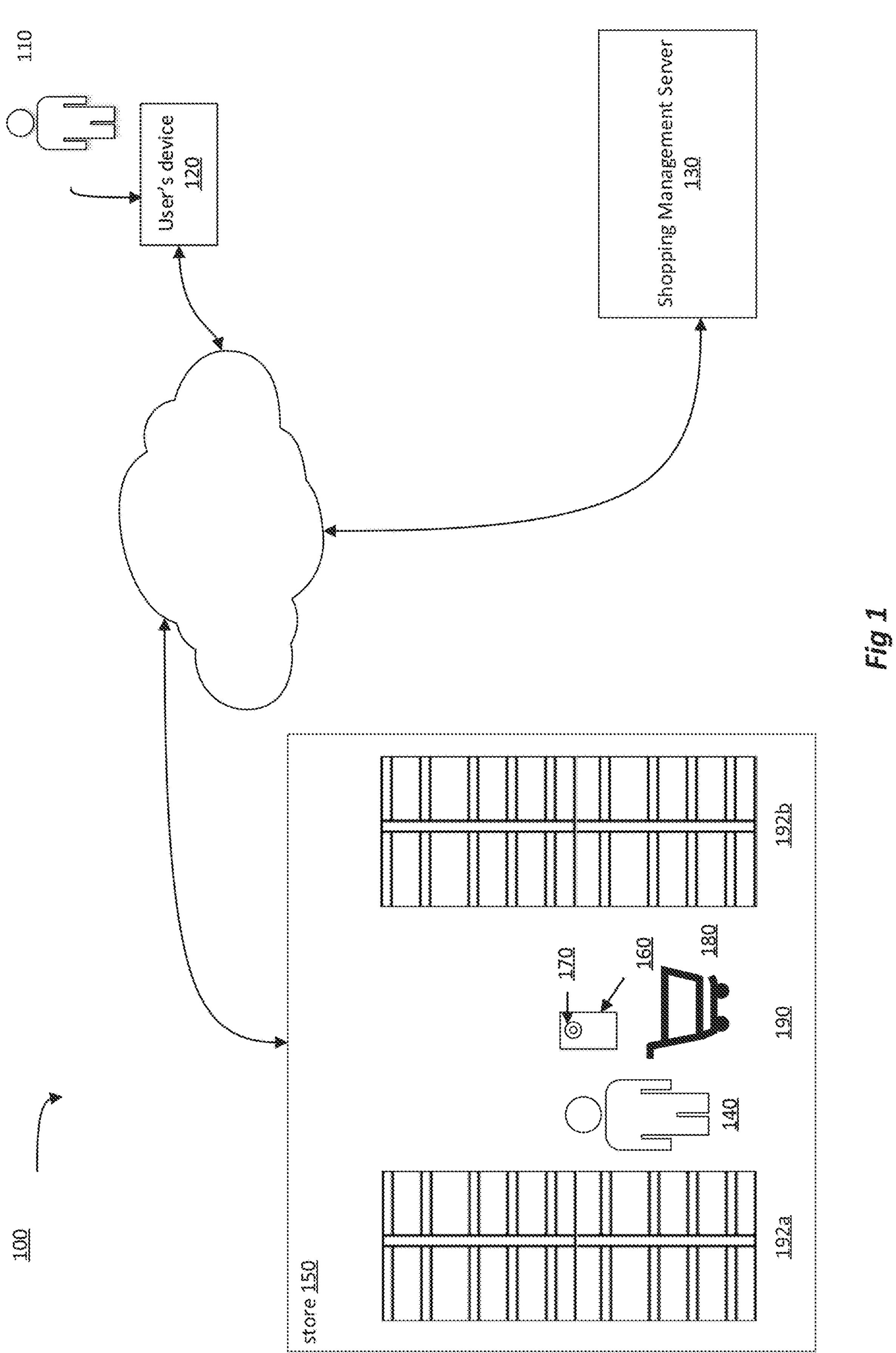
FIG. 1 illustrates a high-level illustration of an online shopping environment 100, in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components, and circuits have not been described in detail so as not to obscure the presently disclosed subject matter.

Unless specifically stated otherwise, as apparent from the following discussions, it is appreciated that throughout the specification discussions utilizing terms such as "shopping", "providing", "receiving", "initiating", "showing", "transmitting", "obtaining", "displaying", "processing", "using", "identifying", "classifying", "calculating", "selecting", "adding", "matching", "sharing" or the like, refer to the action(s) and/or process(es) of a computer that manipulate and/or transform data into other data, said data represented as physical, such as electronic, quantities, and/or said data representing the physical objects. The term "computer" should be expansively construed to cover any kind of hardware-based electronic device with data processing capabilities including a personal computer, a server, a computing system, a communication device, a processor or processing unit (e.g. digital signal processor (DSP), a microcontroller, a microprocessor, a field programmable gate array (FPGA), an application specific integrated circuit (ASIC), etc.), and any other electronic computing device, including, by way of non-limiting example, computerized systems or devices such as a shopping management server 130, a user device 120, and a collector device 160, disclosed in the present application The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes, or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

Usage of conditional language, such as "may", "might", or variants thereof, should be construed as conveying that one or more examples of the subject matter may include, while one or more other examples of the subject matter may not necessarily include, certain methods, procedures, components, and features. Thus, such conditional language is not generally intended to imply that a particular described method, procedure, component, or circuit, is necessarily included in all examples of the subject matter. Moreover, the usage of non-conditional language does not necessarily imply that a particular described method, procedure, component, or circuit, is necessarily included in all examples of the subject matter. Also, reference in the specification to "one case", "some cases", "other cases", or variants thereof, means that a particular feature, structure, or characteristic described in connection with the embodiment(s), is included in at least one embodiment of the presently disclosed subject matter. Thus, the appearance of the phrase "one case", "some cases", "other cases", or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In an attempt to facilitate confidence in online shopping and the accuracy of orders being received by customers, the presently disclosed subject matter includes an online shopping environment that enables a user (also referred to as a customer) to perform an online purchase order, and while the order is being fulfilled, and optionally, during picking-up from the shelves of the items ordered, a video conference may be initiated between the collector of the order and the user. For simplicity, the collector is described as a human, thus a video conference can be initiated between a human collector, such as a person who was assigned to collect the items ordered by the user. The user can comment and guide the collector as to which exact products to pick up, e.g., in the case of vegetables, where the ordered items are not uniquely equal to each other, and the user can guide the collector which exact vegetables to pick (smaller, brighter, softer ones). However, the guidance may also be applicable in case the collector is a machine (e.g., a robot) that may respond to written/voice instructions from a user.

In some examples, the collector may carry a camera capturing a video of the trail in the storage facility in which the order is being collected, the aisle in which the collector is present at the time, and other items placed proximate to the region of the items collected for the user. These other items may be proposed to the user for optional purchase.

It should be noted that throughout the description, reference is made to items selected by the user in a purchase order, however this language should not be limiting, and the user may select only one item in the purchase order, and the presently disclosed subject matter is likewise applicable to a purchase order including one item only.

Bearing this in mind, attention is drawn to FIG. 1 illustrating a generalized diagram of an online shopping environment 100, in accordance with certain embodiments of the currently presented subject matter. Online shopping environment 100 is configured to enable a computer-implemented method for online shopping of a user 110, in an interactive manner, where a video conference is initiated during order fulfillment.

In some examples, environment 100 may include several entities, all operatively communicating via a network. Environment 100 may include a shopping management server 130, a user's device 120 operated by a user 110, a store 150, and a collector's device 160. The shopping management server 130 may be configured to provide a plurality of items for purchase for the user 110, for example, via a dedicated platform, such as a shopping app or a website, displaying available items for purchase. The user 110 may select using his user's device 120, from the available items that are displayed, one or more items for purchase, and the user 110 may place a purchase order including the items he has selected.

The shopping management server 130 may receive the purchase order of the user 110, e.g., via the dedicated platform, and may initiate fulfillment of the purchase order, including e.g., transmitting data of the purchase order to representatives in the store 150 for selecting the items in the purchase order. The store 150 may be any storage facility, such as a supermarket, a retail store, a warehouse, or any other storage facility where items ordered by users can be picked up for fulfilling the order. The store 150 can be selected based on various factors, such as physical proximity to the residence of the user 110, to ease eventual shipping of the items in the purchase order, and is configured to receive the purchase order to a dedicated device in the store 150 configured to communicate with the shopping management server 130 and/or to a device operated by a collector.

A collector 140 assigned to collect the items ordered by the user 110, may be placed within the store 150. The collector 140 may be a human or a machine. The collector 140 may operate a collector device 160 and is configured to communicate with one or more of the shopping management server 130, the store 150, and the user device 120, in order to receive data of the purchase order and conduct a video conference with the user 110 using his user device 120 during fulfillment of the purchase order.

The fulfillment time of an order may refer to any process pertaining to completing a purchase order made by a user, including e.g., receiving the order in the shopping management server 130, processing, and transmitting data pertaining to the purchase order to store 150, picking up orders by the collector 140 in store 150, packing the orders, and shipping the order to the user's residence or any other shipping address, which has been provided by the user.

At any time during fulfillment of the purchase order, a video conference may be initiated between the collector 140 and the user 110, using their respective devices 120 and 160. The user 110 may indicate in the purchase order that he is interested in a video conference during the fulfillment order, and/or initiating a video conference may be available in the shopping platform as a default option. In some examples, in response to receiving the purchase order of the user 110, shopping management server 130 may share with the user 110 a video conference connection link, e.g., by transmitting to the user's device 120 a link or by placing a shared link in the shopping platform. The video conference may later be initiated via the link. Alternatively, or additionally, a connection link may be available in the shopping platform for use by the collector 140 and the user 110. Yet alternatively or additionally, the collector 140 may transmit a connection link to the user's device 120, and the video conference may be initiated via the transmitted link.

In some examples, the video conference occurs during picking up from the shelves, e.g., when at least one item selected by the user in the purchase order is picked up by the collector 140. In such cases, the collector 140 may walk around the store 150, taking a certain trail, while carrying a cart 180. As illustrated in FIG. 1, the collector 140 may walk in an aisle 190 between shelves 190*a* and 190*b*, for the purpose of picking up the items selected by the user 110 in the purchase order. A video conference may be initiated during the picking up process. The user 110 may guide the collector 140 as to the exact items he wishes the collector 140 to pick up for the order. In some examples, the user may wish to avoid from participating in a video conference during the entire picking up process, but do wish to participate only when certain products or product types are being picked up. For example, if the user selected many items for purchase, but wish to participate in a video conference only when the vegetables are being picked up. Hence, the user may indicate in the purchase order, the exact time he wishes to participate (e.g., only if picking up occurs between 8-10 am on the day of the pickup), or only during the time that the vegetables are being picked up. Accordingly, the video conference may be initiated only during partial time of the process of picking up the items, e.g. as indicated by the user.

In some examples, a camera may be located in the storage facility and may be configured to communicate with one or more of the shopping management server 130, the store 150, the user's device 120, or the collector's device 160. In some examples, the camera can be a camera 170 in the collector's device 160. Optionally, the camera can be a separate camera, installed on the cart 180, operated by the collector 140.

The camera is configured to capture a video of one or more items selected by the user in the purchase order. Optionally, the captured video may also include one or more proximate items in a region of the items selected by the user 110. These proximate items may be optional for purchase by the user 110. For example, if the user selected flour in the purchase order, and the collector 140 walks an aisle, and takes from a certain shelf of shelves 192*a* the flour, the video may capture the flour picked up by collector 140, and also other items placed in physical proximity to the flour on the same shelf in shelves 192*a* or proximate shelves e.g. in 192*b*, such as wholewheat flour or pasta items.

In some examples, the system management server 130 is configured to obtain the captured video from camera 170, and to provide in real-time, substantially at the same time as the video conference, data to the user 110, to be displayed on the user's device 120. The data may be the captured video itself, capturing the selected item or the additional proximate items, but may also be data pertaining to the proximate items, such as display of the items, as they appear e.g., in the shopping platform, with the information required for purchasing these items.

In some examples, the user 110 may select one of these proximate items and may request to add it to the purchase order, e.g., by indicating to the collector 140 to add the item, or by selecting it in the shopping platform. The system management server 130 is configured to receive a selection made by the user 140, and may add it to the purchase order. The collector 140 may pick up these additional selected proximate items, and add them to the cart 180.

It should be noted that although described as different entities or elements, camera 170 can be part of the video conference initiated with the user through his user's device, e.g., by collector's device 160. In some examples, the video captured by camera 170 can also be part of the video conference, where the user interface (UI) in the user's device 120 can include an area in which the video conference is held while showing the collector's face, and a separate area displaying the captured video, e.g., with the selected item, as captured by the video. Optionally, another separate area in the UI may display the proximate items and/or data pertaining to these proximate items, as further detailed below. Also, those versed in the art would realize that in some examples, the shopping platform may be configured to display on the player's device 120 the UI as described above, including a display of one or more of the following: the video conference, the captured video, the selected items, the proximate items or data pertaining to these proximate items, and is configured to receive the user's selection of additional proximate items through the shopping platform, e.g. by the user clicking on images or text representing these proximate items.

Figure 2:
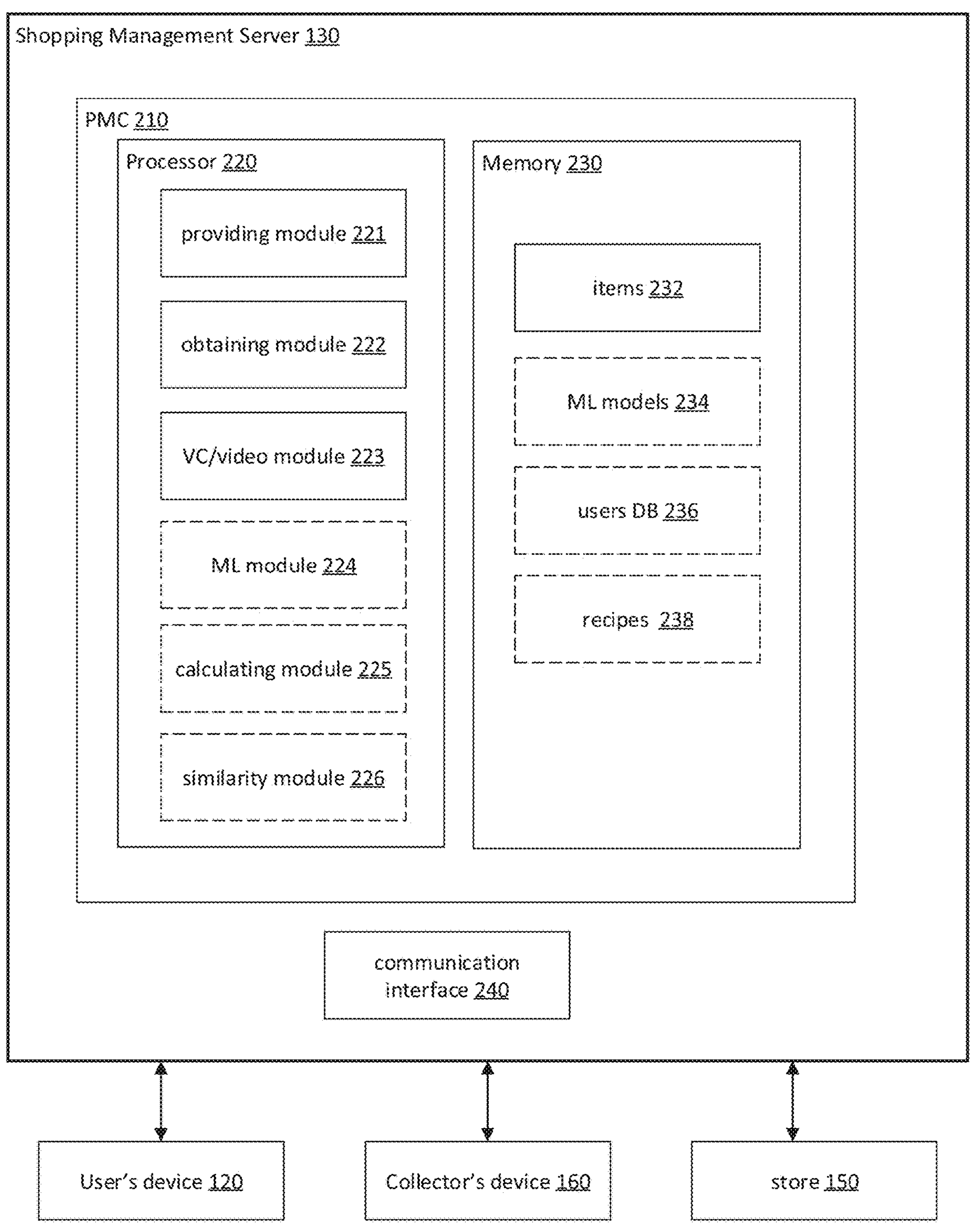
FIG. 2 illustrates a high-level functional block diagram of a Shopping Management Server 130, in accordance with certain embodiments of the presently disclosed subject matter.

Reference is now made to FIG. 2 illustrating a functional block diagram of system management server 130. The illustrated system management server 130 includes a processor and memory circuitry (PMC) 210 comprising a processor 220 and a memory 230. The processor 220 is configured to execute several functional modules in accordance with computer-readable instructions implemented on a non-transitory computer-readable storage medium. Such functional modules are referred to hereinafter as comprised in the processor 220. The processor 220 can comprise a providing module 221, an obtaining module 222, a video conference (VC) module 223, a Machine Learning (ML) module 224, a calculating module 225, and a similarity module 226.

Memory 230 can store stored items 232 for purchase by users, ML models 234, users DB 236, and stored recipes 238. Shopping Management Server 130 may also comprise a communication interface 240 configured to system management server 130 to operatively communicate with external devices such the user's device 120, the collector's device 160, and the store 150, and optionally, with the camera 170, if the camera is separate from the collector's device 160.

In some examples, processor 220, e.g., using providing module 221, is configured to provide a plurality of items for purchase. For example, the items can be displayed in a dedicated shopping platform, enabling users to place a purchase order using the platform. The user 110 can place a purchase order, where the purchase order can include a selection of one or more items from among the plurality of items. Once the user 110 has placed the purchase order, obtaining module 222 can obtain details of the order. For example, obtaining module 222 can receive the purchase order in the platform. VC/video module 223 is configured to enable a video conference to be initiated with the user's device 120, operated by the user, during fulfillment of the purchase order. Further elements of PMC 210 appearing in FIG. 2 will be described in the context of FIG. 3 below.

It is noted that the teachings of the presently disclosed subject matter are not bound by the shopping environment described with reference to FIG. 1, or by the Shopping Management Server 130 described with reference to FIG. 2. Equivalent and/or modified functionality can be consolidated or divided in another manner, and can be implemented in any appropriate combination of software with firmware and/or hardware, and executed on a suitable device. For example, camera 170 can be comprised in collector's device 160, or may be a separate component installed e.g., on cart 180. Also, in some examples, the system management server 130 can be located within store 150.

Those skilled in the art will also readily appreciate that the data repositories/databases in memory 230 can be consolidated or divided in another manner; databases can be shared with other systems or be provided by other systems, including third party equipment.

Figure 3:
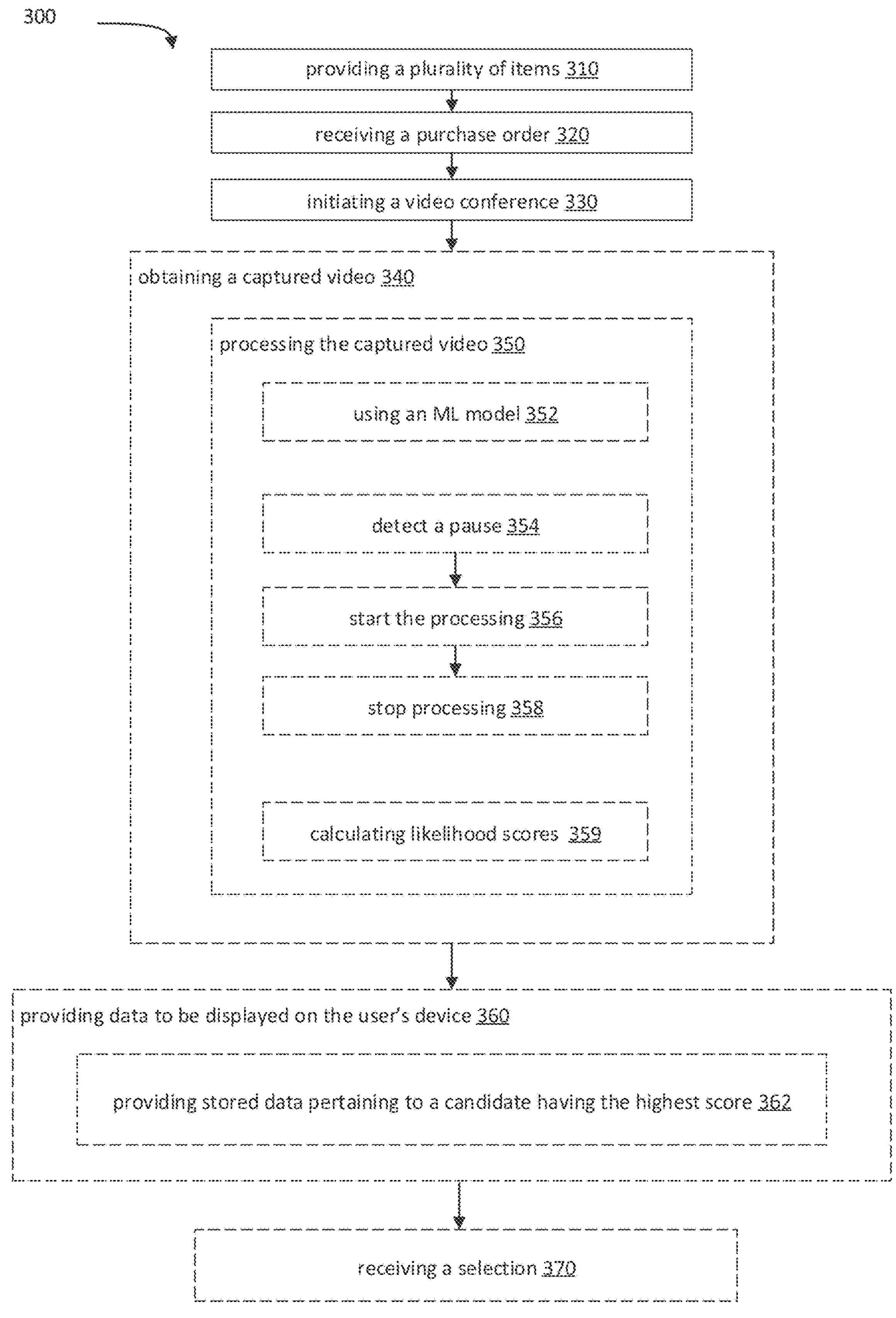
FIG. 3 illustrates a general flowchart of operations performed by the Shopping Management Server, in accordance with certain embodiments of the presently disclosed subject matter.

Reference is now made to FIG. 3, illustrating a general flowchart of operations executed in the shopping management system 130, in accordance with certain embodiments of the presently disclosed subject matter. In some examples, the operations can be performed by entities in the executed system management server 130 illustrated with reference to FIGS. 1 and 2.

In some cases, the process is initiated by the system management server 130, providing a plurality of items for purchase (block 310), e.g., by providing module 221. The items that are available for purchase can be stored in e.g., items 232 in memory 230. For example, the items can be displayed in a dedicated shopping platform, enabling users to place a purchase order using the platform. The user 110 can select one or more items from among the plurality of items for purchase, and can place a purchase order including the selected items. Once the user 110 has placed the purchase order, obtaining module 222 can obtain details of the order, e.g., by receiving the purchase order in the platform (block 320). In some examples, the order may be transmitted to store 150 or to representatives of store 150 such as the collector 140, for order fulfillment, including picking up the items selected by the user, packaging them, and shipping them to the user's shipping address. The collector 140 may wish to initiate a video conference with the user 110. In order to initiate a call, VC/video module 223 may enable a video conference to be initiated with the user's device 120, operated by the user 110, during the fulfillment of the purchase order (block 330). For example, in response to receiving the purchase order, VC/video module 223 can share with the user's device 120 e.g., via the shopping platform, a video conference connection link. During fulfillment order, the video conference can be initiated using the shared link, by both the collector 140 and the user 110. In some examples, the video conference can take place at the time when the collector 140 picks up the items selected by the user in the purchase order.

In some examples, the collector 140 can operate the camera 170 using the collector's device 160, either if the camera 170 is part of the collector's device 160, or if the camera 170 is separate and is located in storage facility such as the store 150, e.g., installed on the cart 180. During order fulfillment, the camera 170 can capture the trail of the collector 140 as he picks up the items selected by the user 110 in the purchase order at store 150. For example, the camera 170 can be positioned in a manner that can capture the trail of the collector 140, the items that he picks up, and other items on shelves, as the collector 140 walks along the aisle of the store 150.

Obtaining module 222 can obtain a captured video from camera 170 (block 340). The video may include the items selected by the user 110. The video may also capture one or more proximate items for optional purchase in a region of the selected items. In the above example of the user selecting a pack of flour in a certain aisle in the store 150, the video can capture the collector 140 picking up the flour from the shelf, and also other items in the region of the flour, e.g., near on by shelves, such as wholewheat flour or pasta.

Providing module 221 can provide, in real-time, data to be displayed on the user's device 120, substantially at the same time as the video conference (block 360). The data can include a copy of the purchase order continuously updated real-time with the items that have been already picked up by the collector 140.

Alternatively, or additionally, the data can include either or both of the captured video and data pertaining to at least one of the proximate items. To illustrate, data provided to the user's device 120 can include the flour picked by the collector 140, as well as a video of the pasta on a nearby shelf, or data pertaining to the pasta. For example, an image of the pasta item, as displayed for purchase in the shopping platform for users with all available information, can be displayed on the user's device 120. The image of the pasta can be configured by providing module 221 to enable the user 110 to select it, e.g., by clicking on the image, and to add it to the current purchase order. Shopping management server 130 can receive the user's additional selection (block 370). As a result, the collector 140 may pick up the selected additional item and may put it in the cart 180.

In some examples, the collector 140 may hold the flour in his hands (or robotic arms if e.g., the collector is non-human) such that the captured video includes a video of the selected at least one item, e.g., the flour. The video may also capture data pertaining to the selected item, e.g., expiration date of the flour, nutrition data including sugar and fat percentages, the name and logo of the manufacturer of the flour, etc.

One technical advantage in cases where the purchase order pertains to non-consumable products, such as a purchase order of clothes, pertains to the information that is captured in the video. In such cases, the collector 140 may hold the clothing item, e.g., a dress, and the video can capture the movement of the fabric in the hands of the collector 140. Consequently, the user 110 may be able to obtain additional information and obtain a better idea of the item. For example, if the dress is made of soft or thick fabric. Also, the user would be able to get better proportions of the dress (when put next to the collector 140), e.g., its length, and neckline shape, and to obtain more exact details on the actual color of the dress. Transmitting the video of the selected item to the user's device 120 may result in better completion of the purchase order, and ultimately reduce the number of returns and replacements.

In some examples, prior to providing the data to be displayed on the user's device 120, the VC/video module 223 can process the captured video to identify the proximate items (block 350). In some examples, it is desired not to display all the proximate items that are identified in the captured video, due to their large number. Assuming that each frame in the video comprises tens of items identified by VC/video module 223, it is advantageous to prioritize them first, and only then select those which are most relevant for the user, and to transmit data pertaining to the most relevant items only. Each of the proximate items that have been identified in the video may be considered as candidates for displaying on the user's device 140. It is advantageous to select a subgroup of the most relevant candidates, or those recommended for the user 110, and to provide stored data pertaining to at least one candidate only, of those which are recommended to be displayed on the user's device 120.

In some examples, the video obtained from camera 170 may be processed using at least one Machine Learning (ML) model (block 352), selected from a plurality of trained ML models stored on ML models 234 in memory 230. ML module 224 may be trained to receive a video and may identify separate objects in the video. The ML module 224 may further classify images and text appearing on each object to a stored item. Hence, during the video conference, the ML module 224 may receive a given video, such as the video from camera 170, and may identify separate objects in a video. For example, ML module 224 can receive the video capturing one or more proximate items in a region of the flour, and may identify the video as including two separate objects (wholewheat flour and pasta). The ML module 224, e.g. with the assistance of similarity module 226, may further classify images and text appearing on each object to stored items. For example, the ML module 224 may extract from identified separate items images and text appearing on the package of an object, such as a logo, nutrition information, barcodes, allergies, if mentioned, name of the manufacturer, list of ingredients, etc. The ML module 224 may classify the text and images appearing on an object to a class corresponding to a stored object. For example, the ML module 224*b* may use the logo of the company of the wholewheat flour and the text indicating that it comprises wholewheat flour, and may classify it to a wholewheat flour item that is available for purchase in the shopping platform.

Various ML models 234 may be used to perform the above, such as object recognition models like e.g., YOLOv5 that implements a deep-learning models that can be tuned to recognize retail products and run quickly even on smartphones with modest performance and Instance segmentation models, and on the other hand, can isolate products, in a similar manner performed for people, by recognizing their irregular boundary contours. Instance segmentation models such as U-Net can be fine-tuned on retail datasets for product segmentation. Compared to object detectors, such algorithms better isolate hidden products, which is a common problem on store shelves, and avoid downstream errors such as incorrect text characters, since the segmented pixels come from only one product. Those versed in the art would realize that other object recognition models can be used for this purpose.

Regardless of the model used, a numerical vector may be calculated for each product, to be referred to as an image embedding. An image embedding may be the result of the neural network (CNNs) searching for all unique local and global image features that characterize each product and encoding them as a numerical vector using a mathematical function. Each product may be presented by a unique image embedding. A vector database may be produced for all the images and a new detected embedding image products may be classified to the most similar embedding image using models like KNN.

Text information extraction match may use libraries such as Tesseract, spaCy, and Hugging Face providing highquality text recognition and information extraction models based on deep neural network architectures such as LSTMs and transformers.

The trained ML models may be stored in ML models 234.

Using text appearing on products to identify the product, instead of or in addition to usage of image processing of logos of companies and names of products to identify the items, may be useful to increase the accuracy of identification of items. In such cases, the ML module 224 may use additional information pertaining to the item, such as information pertaining to the ingredients of the item, in order to identify the item.

As described, the camera 170 may capture in the video the trail of the collector 140 as he walks the isles of the store 150. Since each frame of the captured video may include tens of items for optional purchase by the user, but not all of them may be relevant to the user 110, and furthermore, processing the entire video, in real-time, to identify items for purchase and provide recommendation for the user 110 that will actually be relevant to him from the video, may slow down identification and later selection of the items to be displayed on the user's device 120. It may be advantageous, in some cases, to process only part of the captured video, e.g., only when the collector 140 stops moving along the aisles to collect an item included in the purchase order. Upon pausing movement, both the video that is captured is more stable, and a faster and more accurate identification of the items in the video is achieved. Also, the items that are captured in the video are items that are placed proximate to the region of the items included in the purchase order that are now being collected for the user in the aisles of the store 150. Identifying items proximate to the item that has been selected by the user 110, and then prioritizing and recommending one or more of the identified proximate items to the user 110, may increase the accuracy of the recommendation and the likelihood that the user 110 will be interested in these items, as the chances of interest in items of similar kind may be higher (as they are placed together in the supermarket, and hence, belong to the same category). To illustrate, assume that the user has 110 selected a large amount of vegetables, and the collector 110 has stopped near the vegetable region in the store 150. Capturing video in the region of the vegetables, identifying other vegetables, which are proximate items, and recommending some or all of them for purchase to the user 110, is more likely to result in a higher accuracy of recommendation of items to the user than recommending meat, in cases where that particular user 110 did not select any meat products. Hence, in some examples, the video is captured during discontinuous movement of the collector 140. Before initiating processing of the captured video, VC/video module 223 can monitor the video to detect a pause (block 354) in the movement of the collector 140, and to continue monitoring the video until the pause in movement is over, and movement of the collector 110 is once against detected. A pause can be a period of time which is greater than a pre-defined time threshold, e.g., 2 seconds. After a pause is detected, the ML module 224 can start processing the video, to identify proximate items (block 356). Processing of the video may discontinue in response to detecting movement of the collector 140 (block 358).

In some examples, detecting movement or a pause may be implemented using motion detection algorithms which based on some or al of the following stages:

1. frame differencing: reading consecutive frames from the video and calculating the absolute difference between them. This process highlights the areas where motion occurs.
2. Thresholding: applying a threshold to the difference image obtained by the image differentiation step. In this step, the grayscale difference image may be converted to a binary image in which moving areas are represented as white and static areas are represented as black.

3a. Blob analysis: performing blob analysis on the binary image to identify connected regions or blobs. Each blob corresponds to a potential moving object or region.

3b. Blob analysis: performing a blob analysis of the binary image to identify contiguous regions or blobs. Each blob corresponds to a potentially moving object or region.

4. Calculating movement statistics: calculating motion statistics for each blob detected, such as the position of the centre of gravity, area, or perimeter. These statistics can be used to determine the extent of movement within each region.
5. Defining an immobility threshold: setting a threshold for the motion statistics that determines whether a region is considered immobile.
6. Analyzing the motion statistics: Comparing the calculated motion statistics of each blob to the threshold set in the previous step. If the motion statistics fall below the threshold, the region can be considered motionless.
7. Based on the analysis in the previous step, marking or annotating the frames of the video to indicate the areas or regions where no motion was detected that has resumed.

As described, it may be advantageous to identify proximate items for optional purchase by the user 110, and then to select a subgroup of the identified items for recommendation to the user, and to provide data to be displayed on the user's device 120 on the recommended items. Therefore, in some cases, instead of displaying all proximate items identified in the captured video, the proximate items, constituting candidates for recommendation to be displayed on the user's device, can be prioritized, and only then can one or more candidates be selected, e.g. those with the highest priorities, and may be transmitted for display on the user's device 120. Each proximate item identified in the video constitutes a candidate. Calculating module 225 can calculate for at least one candidate that was identified in the captured video, a likelihood score (block 359). Stored data pertaining to the candidate having the highest score can then be provided e.g., by providing module 221, to be displayed on the user's device 120 (block 362). Assuming that both wholewheat flour and pasta have been identified as candidates, then each of these two items can be associated with a likelihood score, and only one of them, with the higher score, will be recommended to the user. If the pasta product got the highest score, then data pertaining to the pasta can be provided to the user 110. For example, a pasta product, as stored in items 232, may be displayed on the shopping platform, for purchase by the user 110.

Calculating a likelihood score by calculating module 225 may be based on various factors, or a combination of factors. For example, each factor may be associated with a weight in calculating the likelihood score. For example, the calculating module 225 can process the history data of the user, current purchase order, current location of the collector e.g., which aisle in the store 150, and context-based similarity of the candidate to a selected item.

Data pertaining to the user can be stored in user DB 236 in memory 230. For example, the purchase history of a user can be taken into consideration. If the purchase history indicates that the user 110 favors pasta, since it was included in previous purchases, with a certain frequency, then the history may contribute a high weight to the likelihood score of the identified pasta. Another example is the habitual chronological order of the items that the user usually buys, e.g., there may be some findings about the chronological order in the map of purchases in the online shopping cart that could be correlated with the way the physical store is ordered, e.g., for example people usually buy meat in the physical store at the end of the purchase. This factor of the chronological order of the candidate may affect the probability score to be displayed to the user on the screen.

Alternatively or additionally, various recipes of foods may be stored in recipes 238 in memory 230. The likelihood score may be calculated based on a degree of matching of items selected by the user in the purchase order, and a recipe. For example, if the current purchase order of the user 110 includes the following items: tomato sauce, olive oil, and oregano, then matching pasta with a tomato sauce recipe (which is high in this example) may contribute a high weight to the likelihood score of the pasta candidate. Other manipulations on recipes and ingredients in recipes may contribute to calculation of the likelihood score, for example, the degree of frequency of the candidate in stored recipes. For example, the higher degree of frequency of recipes including pasta, the higher weight that factor will be given in calculating the likelihood score.

Once likelihood scores are calculated for candidates, and data pertaining to the candidate having the highest score is provided, additional simultaneous data pertaining to one or more recipes associated with the candidate having the highest score may be provided to the user 110. In the above pasta example, the data to be displayed on the user's device can include data on the pasta item, together with a pasta with tomato sauce recipe, or a link to the recipe.

Another factor that may be used for calculating the likelihood score is the degree of similarity of the user 110 to other users. Data pertaining to users may be stored in users DB 236 in memory 230. The degree of similarity of the user 110 may be calculated to other users stored in DB 236. For a particular user, DB 236 can store data pertaining to the profile of the user, such as age, gender, allergies etc., and likewise data pertaining to activities of the user, such purchases history, frequency of purchases, history of recipes, and/or items previously recommended to the users, etc.

In some examples, the degree of similarity of the user 110 to other users can be determined using a similarity Machine Learning (ML) model trained to classify a given user into a plurality of user classes, based on similarity. Similarity module 226 comprised in processor 220 can execute a similarity ML model stored in ML models 234. The similarity ML model may be trained to classify a feature vector comprising a plurality of features that are extracted from a profile and activities of the given user to a plurality of user classes. The plurality of features can be selected from the data stored in DB 236 for each user, including a group comprising at least: a current purchase order, purchases history, allergies, and history of activities. Given user 110, the similarity ML model may classify the user 110 to a plurality of classes of users, and provide for each of the classes a degree of similarity of the user 110 to that class. The similarity prediction of a user to other users can be done e.g. by the following steps:

1. User data collection: including collecting relevant information about the user, such as: demographics, preferences, behaviors, and interactions.
2. Feature engineering and extractions: including selecting relevant features that can effectively capture user characteristics and interactions like purchases history, interests and history of search etc.
3. Data preprocessing ad model selection: including preparing the data for being suitable for machine learning model training, cleaning the missing data, normalizing and splitting the data for train set and test set.

The similarity to other users can be trained through a hybrid recommending system such as:

1. Collaborative filtering and SVM—the collaborative filtering step helps capturing similarity between users, and the SVM step uses this information to make predictions or classifications based on other features or attributes associated with the users.
2. Neural network and Collaborative filtering: using neural networks to learn the embeddings vectors (latent representations) of users from their historical interactions. These embeddings can then be used as input to a collaborative filtering algorithm, such as user-based collaborative filtering, to generate recommendations.

Hence, during a current purchase order, the degree of similarity of the user 110 to other stored users may be determined. In some cases where the user 110 has been determined to be similar to a certain class of other users, a determination of the data that will be recommended to that user 110 can be made based on the similarity to that class of other users. For example, if for that class of users, a certain candidate is determined to be recommended, then that candidate will also be recommended for the user 110. Another example would be the recipes that are recommended for that class of users. If a certain recipe is selected to be recommended, then that recipe may also be recommended for the user 110. Data on any ingredients of that recipe, which are missing from the user's current phrase order, may be recommended as well to the user 110.

Referring back to block 360, providing module 221 can provide, in real-time, data to be displayed on the user's device 120, substantially at the same time as the video conference. The data can include data pertaining to one or more candidates, optionally, based on any likelihood score calculated for the candidates, and candidates that were determined as recommended, as described above. The data may be provided to be displayed in a continuous manner as the collector 140 continues his trail in the store 105. The provided data may be continuously replaced, in a smooth manner, such that for a certain aisle, certain items will be displayed on the user's device 120, and in another aisle, other items will be displayed.

The user 110 may select a recommended item, a candidate that is displayed, for purchase. The selection may be received by obtaining module 222 (block 370) and may be added to the purchase order. The collector 140 may add this additional selected item to the cart 180.

In some examples, there is an advantage to confirm that the items that were added to the cart 180 by the collector 140 match the purchase order, either the one that was initially received by the user 110, or any updated purchase order, in case the user 110 has selected additional items to be added to the purchase order during the video conference. In order to confirm a match, each item of the plurality of items for purchase, as stored in items 232, may be associated with an identifying vector using a vector embedding Machine Learning (ML) model. The identifying vector for each item may also be stored in items 232. Trained vector embedding Machine Learning (ML) model may be stored in ML models 234.

Processor 220 may repeatedly process the captured video to identify the selected item using the vector embedding ML model, and add the identified selected item to previously identified selected items, together constituting a virtual cart. Assuming for example, that the collector 140 has picked up a flour item, since flour was included in the purchase order of the user 110. Processor 220 may process the captured video, using the vector embedding ML model, and identifies that one flour item was picked up. The processor 220 adds one item of flour to a virtual cart. If the processor 220 processes the captured video and counted a second flour that was picked up, the processor 220 adds one additional item of flour to a virtual cart (or associates a counter of 2 to the flour items). The processor 220 may repeatedly compare the virtual cart to the purchase order (either the original one as received for order fulfillment, or to an updated purchase order, if, for example, the user selected additional items for purchase during the video conference) to determine a mismatch in types or amounts of items. For example, if the purchase order included 1 pack of flour only, and 2 were identified in the captured video and were added to the virtual cart, then processor 220 may take one or more actions. For example, processor 220 may send an alert to collector's device 160 indicating the mismatch. Processor 220 may also send an alert to additional entities predefined in the shopping management server 130. Alternatively, or additionally, processor 220 may also reject the addition of the mismatched items, e.g., the second pack of flour, to an invoice currently being updated for the user 110 for his purchase order. Those versed in the art would realize that other actions may be available in case of a mismatch. Also, the presently disclosed subject matter should not be limited by the particular implementation of confirming mismatched virtual cart to a purchase order, and other implementations may also be applicable, such as reducing, from a copy of the purchase order, the items that have been already picked up, and taking an action in case of a mismatch.

For the sake of clarity, the term "substantially" may be used herein to imply the possibility of a partial overlap in time for the two communications, e.g., between the video conference and the video captured by the camera. Thus, while "at the same time" may be interpreted to occur exactly at the same time, "substantially simultaneous" expands this term to include also that one of the communications is established or transmitted to the user, or is received at the user's device, sufficiently close in time to the other communication, while the other communication is still ongoing, while at least a partial overlap in time during the communication can occur.

It is noted that, as is well known in the art, systems operating in real-time may experience some delay between the onset of a command and its execution, due to various reasons, such as processing time and/or network communication delay. The term real-time as used herein is meant to include near real-time i.e., operation in systems that may experience some internal delays.

It should be noted that the term "criterion" or "factor" as used herein should be expansively construed to include any compound criterion, including, for example, several criteria and/or their logical combinations. Also, the specific examples of criteria should not be considered as limiting, and those skilled in the art will readily appreciate that the teachings of the presently disclosed subject matter are, likewise, applicable to other criteria.

It is noted that the teachings of the presently disclosed subject matter are not bound by the flow chart illustrated in FIG. 3, and that the illustrated operations can occur out of the illustrated order. For example, operations 352, 354-358 and 359, shown in succession, can be executed substantially concurrently, or in the reverse order.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computer-implemented method for online shopping and order fulfillment, the method comprising:
- providing a plurality of items for purchase;
- receiving a purchase order for at least one item selected by a user from among the plurality of items; and
- during at least part of the fulfillment of the purchase order, initiating a video conference between a user's device operated by the user and a collector's device operated by a collector;
- during the video conference:
  - capturing a video, by the device of the collector, of the selected at least one item and one or more proximate items during discontinuous movement of the collector;
  - processing, using a vector embedding machine learning (ML) model, the captured video to identify the selected at least one item and the one or more proximate items based on respective identifying vectors of the selected at least one item and the one or more proximate items, wherein processing the captured video further comprises:
    - detecting a pause in the movement of the collector;
    - start the processing of the captured video in response to detecting the pause in the movement of the collector; and,
    - stop the processing of the captured video in response to detecting movement of the collector has resumed.

2. The method of claim 1, wherein the video conference occurs when at least one selected item is being picked up.

3. The method of claim 1, further comprising:
- in response to receiving the purchase order, sharing with the user's device a video conference connection link; and
- initiating the video conference via the link.

4. The method of claim 1, further comprising:
- providing, in real-time, at least one of the following data to be displayed on the user's device at substantially the same time as the video conference:

at least part of the captured video; and data pertaining to at least one of the proximate items.

5. The method of claim 4, wherein the method further comprises:

repeatedly:

adding the identified selected item to previously identified selected items, together constituting a virtual cart; and in response to a mismatch between the virtual cart and the purchase order, taking an action.

6. The method of claim 4, wherein the at least part of the captured video includes video of the selected at least one item.

7. The method of claim 4, further comprising:

prior to providing the data, processing the captured video to identify the proximate items, wherein each identified proximate item constitutes a candidate; and providing stored data pertaining to at least one candidate to be displayed on the user's device.

8. The method of claim 7 comprising:

using a Machine Learning (ML) model to process the captured video.

9. The method of claim 8, wherein the ML model is trained to:

identify separate objects in a given video; and classify images and text, appearing on each object, to a stored item.

10. The method of claim 9 wherein the text includes at least one of the following data: nutrition data, name of manufacturer, list of ingredients, and allergies.

11. The method of claim 7, wherein processing the video further comprises calculating a likelihood score for the at least one candidate; and wherein providing the stored data comprises providing stored data pertaining to the candidate having the highest score.

12. The method of claim 11, wherein the likelihood score is calculated based on at least one of the following data: history data of the user, current location of the collector, and context-based similarity of the candidate to a selected item.

13. The method of claim 11, wherein the likelihood score is calculated based on a degree of matching of the selected items and the candidate, to one or more stored recipes.

14. The method of claim 11, wherein the likelihood score is calculated based on a degree of frequency of the candidate in stored recipes.

15. The method of claim 13, further comprising:

providing data pertaining to at least one stored recipe associated with the candidate having the highest score.

16. The method of claim 11, wherein the likelihood score is calculated based on a degree of similarity of the user to other users.

17. The method of claim 16, wherein the degree of similarity is determined using a similarity Machine Learning (ML) model trained to classify a given user into a plurality of user classes.

18. The method of claim 17, wherein the similarity ML model is trained to classify a feature vector comprising a plurality of features that are extracted from a profile and activities of the given user to a plurality of user classes, wherein the activities of the user include one or more of purchases history, frequency of purchases, and history of recipes and/or items previously provided to given user.

19. The method of claim 11, wherein the likelihood score is calculated based on a habitual chronological order of the user.

20. The method of claim 7, further comprising:

receiving a selection made by the user of one of the candidates.

21. A computer system for online shopping, the system comprising a processing circuitry comprising at least one processer and computer memory, the processing circuitry is being configured to execute a method as defined by claim 1.

22. A non-transitory computer readable storage medium tangibly embodying a program of instructions that, when executed by a computer, cause the computer to perform a method for online shopping as defined by claim 1.

23. A system of online shipping and order fulfillment, the system comprising:

a user device;

a collector device configured to communicate with the user device;

a shopping management server configured to provide a plurality of items for purchase;

receive a purchase order for at least one item selected by a user from among the plurality of items;

cause initiation of a video conference between the user device and the collector device during fulfillment of the purchase order;

cause video captured during the video conference to be processed, wherein the captured video comprises video of the selected at least one item and one or more proximate items for optional purchase;

detect a pause in the movement of the collector;

cause the captured video to be processed in response to detecting the pause in the movement of the collector; and cause the captured video to stop being processed in response to detecting movement of the collector has resumed;

wherein, causing the video captured to be processed further comprises using a vector embedding machine learning (ML) model to identify the selected at least one item and the one or more proximate items based on respective identifying vectors of the selected at least one item and the one or more proximate items.

24. The system of claim 23, further comprising:

a camera located in a storage facility, configured to communicate with the shopping management server and the user's device, wherein the camera is configured to capture the captured video;

wherein the shopping management server is configured to provide, in real-time, at least one of the following data to be displayed on the user's device at substantially the same time as the video conference:

at least part of the captured video; and data pertaining to at least one of the proximate items.

25. The system of claim 24, wherein the camera is configured to capture a video of the selected at least one item.

26. The system of claim 24, wherein the camera is connected to a collector, and wherein the camera is configured to capture the video during discontinuous movement of the collector, and wherein the shopping management server is configured to:

detect a pause in the movement of the collector;

start processing the video; and stop processing the video in response to identifying movement.

* * * * *